United States Patent
Ko et al.

(10) Patent No.: US 9,510,335 B2
(45) Date of Patent: Nov. 29, 2016

(54) METHOD AND APPARATUS FOR TRANSCEIVING CONTROL INFORMATION FOR UPLINK MULTI-ANTENNA TRANSMISSION

(75) Inventors: Hyunsoo Ko, Anyang-si (KR); Moonil Lee, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 13/700,005

(22) PCT Filed: May 26, 2011

(86) PCT No.: PCT/KR2011/003866
§ 371 (c)(1),
(2), (4) Date: Jan. 24, 2013

(87) PCT Pub. No.: WO2011/149286
PCT Pub. Date: Dec. 1, 2011

(65) Prior Publication Data
US 2013/0201932 A1    Aug. 8, 2013

Related U.S. Application Data

(60) Provisional application No. 61/348,254, filed on May 26, 2010, provisional application No. 61/357,500, filed on Jun. 22, 2010.

(51) Int. Cl.
*H04W 72/04* (2009.01)
*H04L 1/00* (2006.01)
(Continued)

(52) U.S. Cl.
CPC .......... *H04W 72/042* (2013.01); *H04L 1/0061* (2013.01); *H04L 1/06* (2013.01); *H04L 5/0023* (2013.01); *H04L 5/0053* (2013.01); *H04W 72/0406* (2013.01)

(58) Field of Classification Search
USPC ....................................................... 370/329
See application file for complete search history.

(56) References Cited

U.S. PATENT DOCUMENTS

2008/0232449 A1* 9/2008 Khan et al. ................... 375/220
2009/0196366 A1* 8/2009 Shen et al. ................... 375/260
(Continued)

FOREIGN PATENT DOCUMENTS

WO    WO 2009110821 A1 *  9/2009

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 9)"; Mar. 2010, 3GPP TS 36.212 V9.1.0.*
(Continued)

*Primary Examiner* — Brandon Renner
*Assistant Examiner* — Manuel Rangel
(74) *Attorney, Agent, or Firm* — Lee, Hong, Degerman, Kang & Waimey

(57) ABSTRACT

The present description relates to a wireless communication system, and more particularly, to a method and apparatus for transceiving control information for uplink multi-antenna transmission. A method for transmitting control information for uplink multi-antenna transmission according to one embodiment of the present invention comprises the following steps: attaching a CRC parity bit to a PDCCH payload sequence containing uplink transmission resource allocation information; scrambling the CRC parity bit attached to the payload sequence to a bit sequence which indicates control information for uplink multi-antenna transmission; and transmitting the entirety of the sequence to which the scrambled CRC parity bit is attached to the payload sequence.

14 Claims, 8 Drawing Sheets

(51) Int. Cl.
*H04L 5/00* (2006.01)
*H04L 1/06* (2006.01)

(56) References Cited

U.S. PATENT DOCUMENTS

| 2009/0213944 | A1* | 8/2009 | Grant | H04B 1/712 |
| --- | --- | --- | --- | --- |
| | | | | 375/260 |
| 2010/0034152 | A1* | 2/2010 | Imamura | 370/329 |
| 2010/0151874 | A1* | 6/2010 | Cai et al. | 455/452.1 |
| 2010/0158142 | A1* | 6/2010 | Yu et al. | 375/260 |
| 2010/0195604 | A1* | 8/2010 | Papasakellariou et al. | 370/329 |
| 2010/0195624 | A1* | 8/2010 | Zhang et al. | 370/335 |
| 2010/0195748 | A1* | 8/2010 | Nam | H04J 11/0069 |
| | | | | 375/260 |
| 2010/0202373 | A1* | 8/2010 | Chun et al. | 370/329 |
| 2010/0246516 | A1* | 9/2010 | Pelletier | H04B 7/0404 |
| | | | | 370/329 |
| 2010/0246561 | A1* | 9/2010 | Shin | H04W 52/32 |
| | | | | 370/345 |
| 2010/0275083 | A1* | 10/2010 | Nam et al. | 714/748 |
| 2011/0085513 | A1* | 4/2011 | Chen et al. | 370/330 |
| 2011/0103338 | A1* | 5/2011 | Astely et al. | 370/329 |
| 2011/0116463 | A1* | 5/2011 | Ishii et al. | 370/329 |
| 2011/0222485 | A1* | 9/2011 | Nangia et al. | 370/329 |
| 2012/0140712 | A1* | 6/2012 | Yamada et al. | 370/329 |
| 2012/0250742 | A1* | 10/2012 | Tiirola | H04L 25/03343 |
| | | | | 375/219 |

OTHER PUBLICATIONS

Motorola, "UE Transmit Antenna Selection", R1-082109, 3GPP TSG RAN1#53, May 2008, 1 page.

Panasonic, "PDCCH payload formats, sizes and CCE aggregation", R1-080130, 3GPP TSG-RAN WG1 Meeting #51bis, Jan. 2008, 6 pages.

Mitsubishi Electric, "UE specific PDCCH scrambling for blind detection complexity reduction", R1-080850, 3GPP TSG RAN WG1 #52 meeting, Feb. 2008, 5 pages.

PCT International Application No. PCT/KR2011/003866, Written Opinion of the International Searching Authority dated Jan. 18, 2012, 15 pages.

* cited by examiner (a)

(b)

METHOD AND APPARATUS FOR TRANSCEIVING CONTROL INFORMATION FOR UPLINK MULTI-ANTENNA TRANSMISSION

CROSS-REFERENCE TO RELATED APPLICATIONS

This application is the National Stage filing under 35 U.S.C. 371 of International Application No. PCT/KR2011/003866, filed on May 26, 2011, which claims the benefit of U.S. Provisional Application Ser. No. 61/348,254 filed on May 26, 2010, and U.S. Provisional Application Ser. No. 61/357,500 filed on Jun. 22, 2010, the contents of which are all hereby incorporated by reference herein in their entirety.

TECHNICAL FIELD

The present invention relates to a wireless communication system, and more specifically, to a method and apparatus for transceiving control information for uplink multi-antenna transmission.

BACKGROUND ART

Multi-antenna transmission is also called Multiple Input Multiple Output (MIMO). MIMO can increase the efficiency of data transmission and reception using multiple transmit antennas and multiple receive antennas. MIMO schemes include spatial multiplexing, transmit diversity, beamforming, etc. A MIMO channel matrix formed according to the number of receive antennas and the number of transmit antennas can be decomposed into a plurality of independent channels and each independent channel is called a layer or stream. The number of layers or streams or a spatial multiplexing rate is called a rank.

While the legacy 3GPP LTE system (e.g., 3GPP LTE release 8 or 9) supports downlink transmission through up to 4 transmit antennas, the 3GPP LTE-A standard discusses support of downlink transmission through up to 8 transmit antennas in 3GPP LTE-A system evolved from the 3GPP LTE system.

DISCLOSURE

Technical Problem

A base station can transmit control information for uplink transmission to a user equipment (UE). While control information for uplink single-antenna transmission has been defined, it is difficult to apply this control information to uplink multi-antenna transmission. Accordingly, it is necessary to newly define control information for uplink multi-antenna transmission in order to support uplink multi-antenna transmission.

An object of the present invention is to provide control information for supporting uplink multi-antenna transmission. Specifically, an object of the present invention is to provide a method and apparatus for transceiving control information regarding mapping of uplink antennas and a power amplifier (PA), uplink scheduling control information about different uplink resource allocation schemes and control information for triggering uplink sounding reference signal (SRS) transmission.

The technical problems solved by the present invention are not limited to the above technical problems and those skilled in the art may understand other technical problems from the following description.

Technical Solution

According to one aspect of the present invention, a method for transmitting control information for uplink multi-antenna transmission includes: attaching a cyclic redundancy check (CRC) parity bit to a physical downlink control channel (PDCCH) payload sequence containing uplink transmission resource allocation information; scrambling the CRC parity bit attached to the PDCCH payload sequence to a bit sequence which indicates control information for uplink multi-antenna transmission; and transmitting the entirety of the sequence in which the scrambled CRC parity bit is attached to the PDCCH payload sequence.

According to another aspect of the present invention, a method for performing uplink multi-antenna transmission includes: receiving the entirety of a sequence which is obtained by attaching a CRC parity bit to a PDCCH payload sequence containing uplink transmission resource allocation information and scrambling the CRC parity bit attached to the PDCCH payload sequence, the sequence indicating control information for uplink multi-antenna transmission; and acquiring uplink multi-antenna transmission scheduling information from the PDCCH payload sequence, obtaining control information for uplink multi-antenna transmission from the CRC parity bit and performing uplink multi-antenna transmission according to the acquired scheduling information and the control information.

According to another aspect of the present invention, an eNB transmitting control information for uplink multi-antenna transmission in a wireless communication system includes: a transmission module for transmitting a downlink signal to a UE; a reception module for receiving an uplink signal from the UE; and a processor for controlling the eNB including the reception module and the transmission module, wherein the processor is configured to attach a CRC parity bit to a PDCCH payload sequence containing uplink transmission resource allocation information, to scramble the CRC parity bit attached to the PDCCH payload sequence to a bit sequence which indicates control information for uplink multi-antenna transmission, and to transmit, to the UE, the entirety of the sequence in which the scrambled CRC parity bit is attached to the PDCCH payload sequence.

According to another aspect of the present invention, a UE performing uplink multi-antenna transmission in a wireless communication system includes: a transmission module for transmitting an uplink signal to an eNB; a reception module for receiving a downlink signal from the eNB; and a processor for controlling the UE including the reception module and the transmission module, wherein the processor is configured to receive, through the reception module, the entirety of a sequence which is obtained by attaching a CRC parity bit to a PDCCH payload sequence containing uplink transmission resource allocation information and scrambling the CRC parity bit attached to the PDCCH payload sequence, the sequence indicating control information for uplink multi-antenna transmission, wherein the processor is configured to acquire uplink multi-antenna transmission scheduling information from the PDCCH payload sequence, to obtain control information for uplink multi-antenna transmission from the CRC parity bit and to perform uplink multi-antenna transmission according to the acquired scheduling information and the control information.

The following can be commonly applied to the above embodiments of the present invention.

The control information for uplink multi-antenna transmission may be control information that defines antenna-to-power amplifier mapping, wherein, when a bit sequence that indicates the control information which defines antenna-to-power amplifier mapping has a first value, the bit sequence indicates mapping of a power amplifier having highest power to antenna port 0 or antenna port group and, when the bit sequence has a second value, the bit sequence indicates mapping of the power amplifier having highest power to antenna port 1 or antenna port group 1. Here, whether mapping of uplink multiple antennas to multiple power amplifiers is set may be indicated through higher layer signaling.

The control information for uplink multi-antenna transmission may be control information for differentiating contiguous resource allocation (CRA) from non-contiguous resource allocation (NCRA), wherein, when a bit sequence that indicates the control information for differentiating CRA from NCRA has a first value, the bit sequence indicates that CRA is applied and, when the bit sequence has a second value, the bit sequence indicates NCRA is applied. Here, whether NCRA is allowed may be indicated through higher layer signaling. When the higher layer signaling indicates that NCRA is allowed, the bit sequence indicating the control information for differentiating CRA from NCRA indicates that single antenna port (SA)-CRA is applied when the bit sequence has a first value, and the bit sequence indicates that SA-NCRA is applied when the bit sequence has a second value.

The control information for uplink multi-antenna transmission may be control information that indicates aperiodic sounding reference signal (SRS) transmission through multiple uplink antennas, wherein, when a bit sequence indicating the control information that indicates aperiodic SRS transmission has a first value, the bit sequence indicates aperiodic SRS transmission through multiple uplink antennas and, when the bit sequence has a second value, the bit sequence does not indicate aperiodic SRS transmission through multiple uplink antennas. Here, whether or not to set aperiodic SRS transmission through uplink multiple antennas may be indicated through higher layer signaling.

The technical problems solved by the present invention are not limited to the above technical problems and those skilled in the art may understand other technical problems from the following description.

Advantageous Effects

According to the present invention, control information for supporting uplink multi-antenna transmission can be provided. Specifically, a method and apparatus for transceiving control information regarding uplink antenna-to-power amplifier mapping, uplink scheduling control information about different uplink resource allocation schemes, and uplink sounding reference signal (SRS) transmission triggering control information can be provided.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
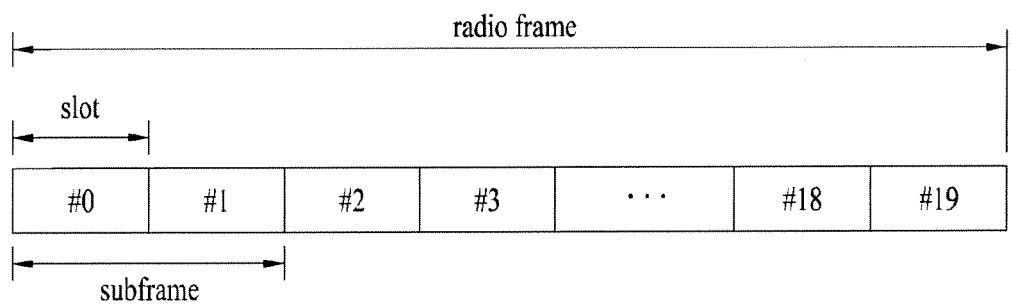
FIG. 1 illustrates an exemplary radio frame structure used in a 3GPP LTE system.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto. For example, the technical spirit of the present invention is applicable to OFDM based mobile communication systems (e.g. IEEE 802.16m or 802.16x system) in addition to LTE-A.

FIG. 1 illustrates a radio frame structure in the 3GPP LTE system. A radio frame is divided into 10 subframes. Each subframe is further divided into two slots in the time domain. A unit time during which one subframe is transmitted is defined as Transmission Time Interval (TTI). For example, one subframe may be 1 ms in duration and one slot may be 0.5 ms in duration. A slot may include a plurality of Orthogonal Frequency Division Multiplexing (OFDM) symbols in the time domain. Because the 3GPP LTE system adopts OFDMA for downlink, an OFDM symbol represents one symbol period. A symbol may be referred to as an SC-FDMA symbol or symbol period on the uplink. A Resource Block (RB) is a resource allocation unit including a plurality of contiguous subcarriers in a slot. This radio frame structure is purely exemplary and thus the number of subframes in a radio frame, the number of slots in a subframe, or the number of OFDM symbols in a slot may vary.

Figure 2:
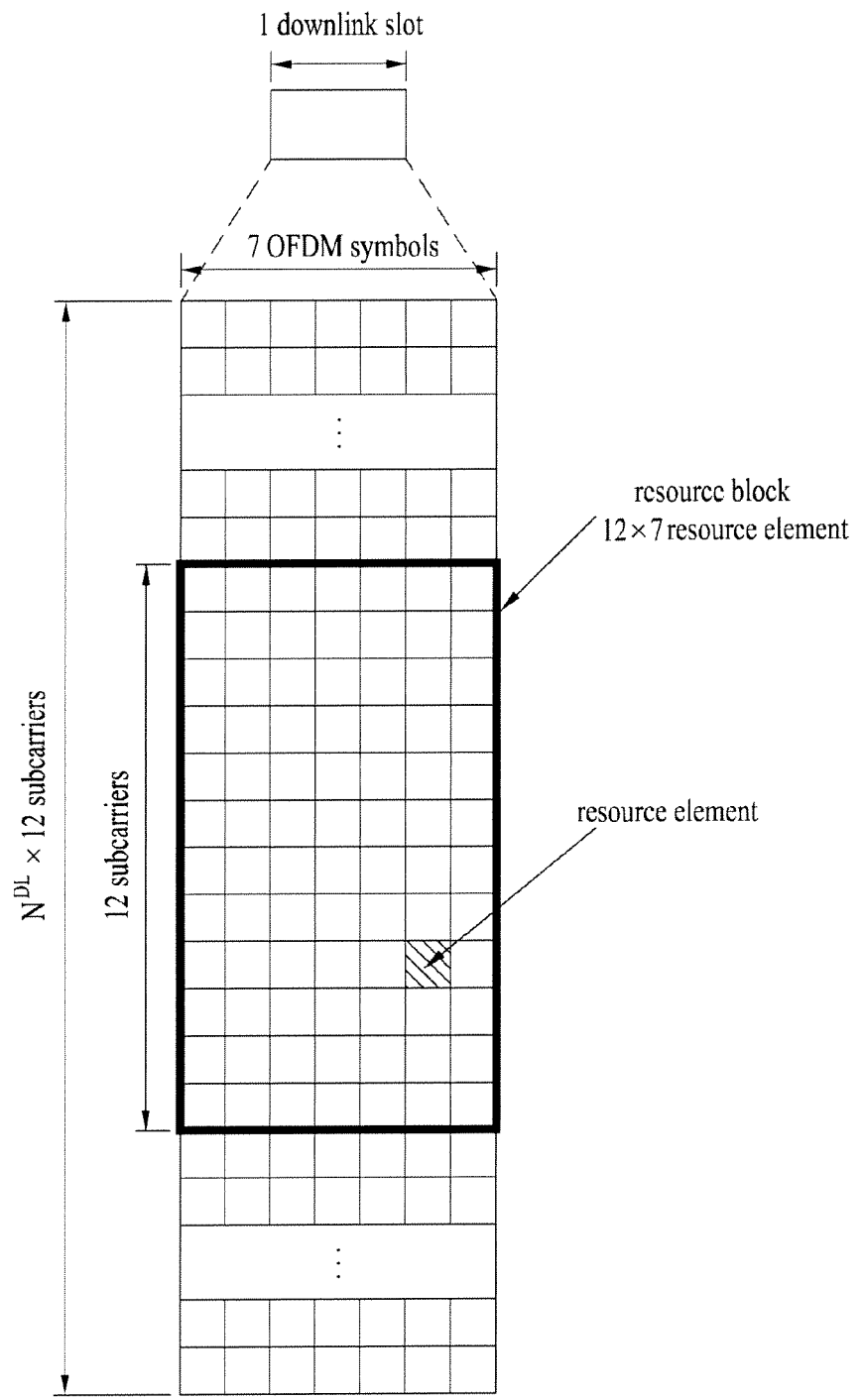
FIG. 2 illustrates a resource grid in a downlink slot.

FIG. 2 illustrates the structure of a resource grid in a downlink slot. A downlink slot includes 7 OFDM symbols in the time domain and an RB includes 12 subcarriers in the frequency domain, which does not limit the scope and spirit of the present invention. For example, a downlink slot includes 7 OFDM symbols in case of a normal Cyclic Prefix (CP), whereas a downlink slot includes 6 OFDM symbols in case of an extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
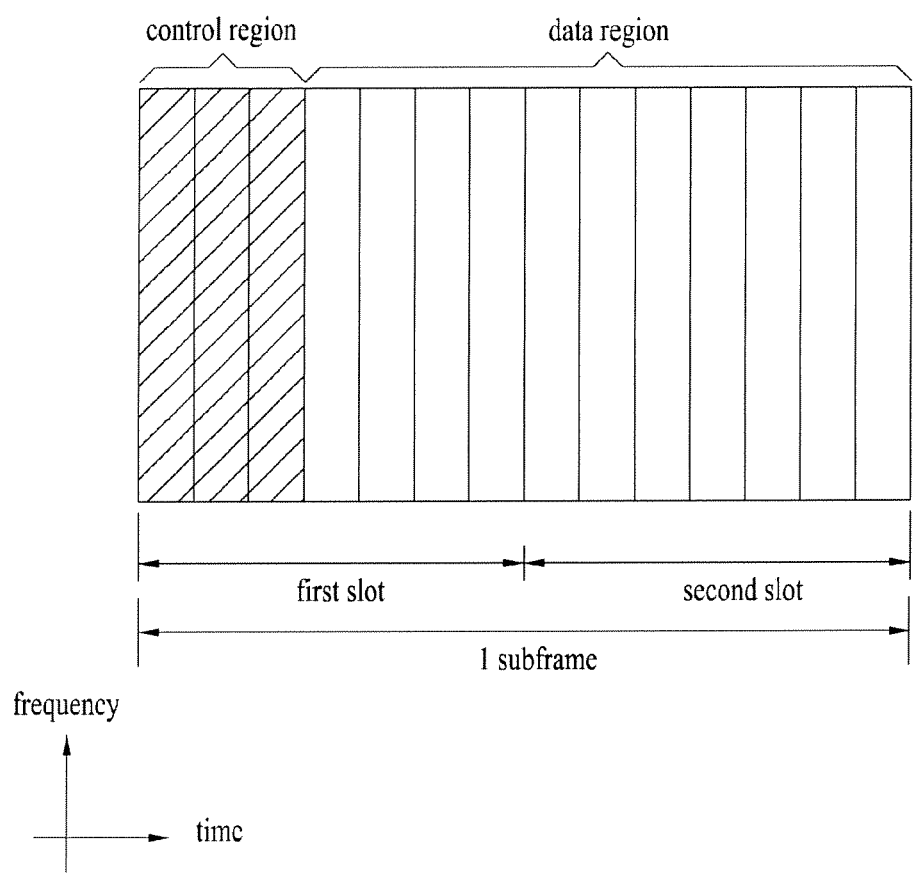
FIG. 3 illustrates a downlink subframe structure.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a Physical Downlink Shared Channel (PDSCH) is allocated. Downlink control channels used in the 3GPP LTE system include a Physical Control Format Indicator Channel (PCFICH), a Physical Downlink Control Channel (PDCCH), and a Physical Hybrid automatic repeat request (ARQ) Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI includes uplink or downlink scheduling information, or uplink transmission power control commands for UE groups.

The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE includes a set of REs. The format of a PDCCH and the number of available bits for the PDCCH are determined according to the correlation between the number of CCEs and a coding rate provided by the CCEs. An eNB determines the PDCCH format according to DCI transmitted to a UE and attaches a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information (particularly, a System Information Block (SIB)), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

A UE detects a PDCCH using blind decoding. Blind decoding is to attempt PDCCH decoding according to hypotheses developed for various formats of DCI (PDCCH DCI formats). DCI can have predetermined various formats (e.g. various bit lengths). The UE performs PDCCH decoding without being informed of a DCI format. For example, when PDCCH decoding according to one hypothesis is successfully performed, the UE can perform an operation according to DCI corresponding to the hypothesis. However, if the decoding is not successful, the UE can attempt to perform PDCCH decoding according to a different hypothesis.

Figure 4:
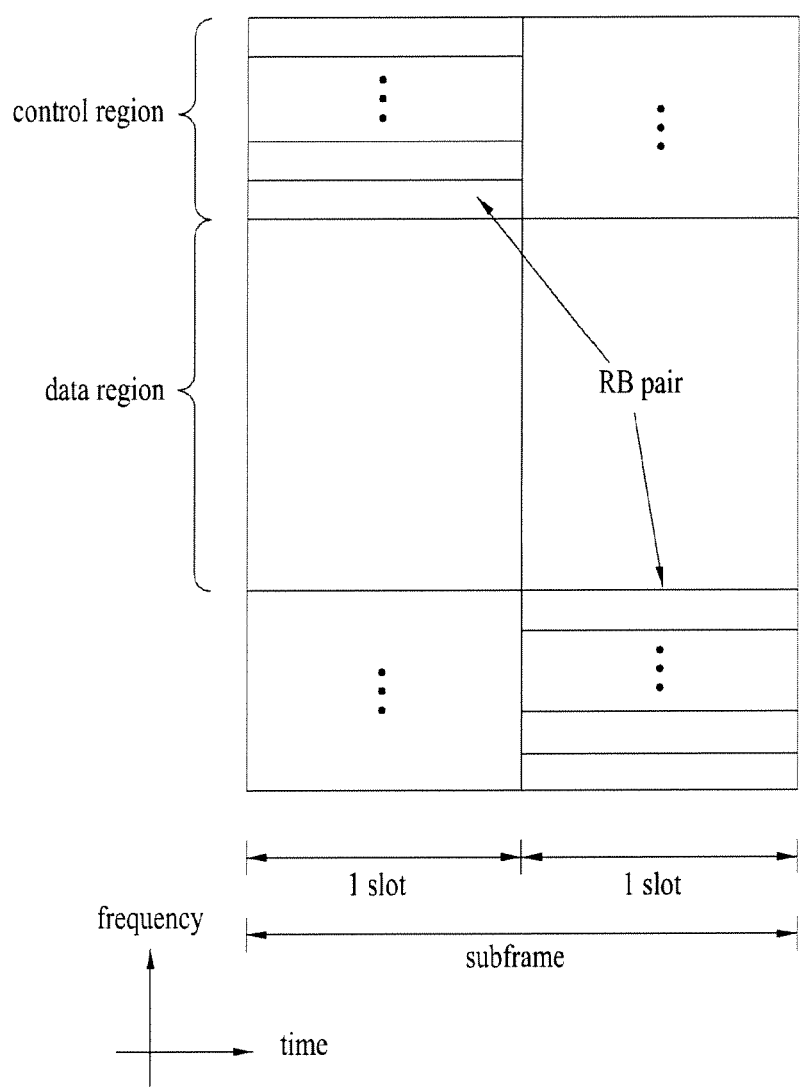
FIG. 4 illustrates an uplink subframe structure.

FIG. 4 illustrates an uplink subframe structure. An uplink subframe may be divided into a control region and a data region in the frequency domain. A Physical Uplink Control Channel (PUCCH) carrying uplink control information is allocated to the control region and a Physical Uplink Shared Channel (PUSCH) carrying user data is allocated to the data region. To maintain single-carrier characteristics, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Multi-Antenna System

MIMO does not depend on a single antenna path to receive a whole message. Rather, it completes the message by combining data fragments received through a plurality of antennas. Because MIMO can increase data rate within a certain area or extend system coverage at a given data rate, it is considered as a promising future-generation mobile communication technology that may find its use in a wide range including mobile terminals, relays, etc. MIMO can overcome a limited transmission capacity caused by increased data communication.

MIMO schemes can be categorized into spatial multiplexing and spatial diversity depending on whether the same data is transmitted or not. In spatial multiplexing, different data is transmitted simultaneously through a plurality of transmit/receive antennas. As a transmitter transmits different data through different Tx antennas and a receiver distinguishes the transmission data by appropriate interference cancellation and signal processing, a transmission rate can be increased by as much as the number of transmission antennas. Spatial diversity is a scheme that achieves transmit diversity by transmitting the same data through a plurality of Tx antennas. Space time channel coding is an example of spatial diversity. Since the same data is transmitted through a plurality of Tx antennas, spatial diversity can maximize a transmission diversity gain (a performance gain). However, spatial diversity does not increase transmission rate. Rather, it increases transmission reliability using a diversity gain. These two schemes may offer their benefits when they are appropriately used in combination. In addition, MIMO schemes may be categorized into open-loop MIMO (or channel-independent MIMO) and closed-loop MIMO (or channel-dependent MIMO) depending on whether a receiver feeds back channel information to a transmitter.

Figure 5:
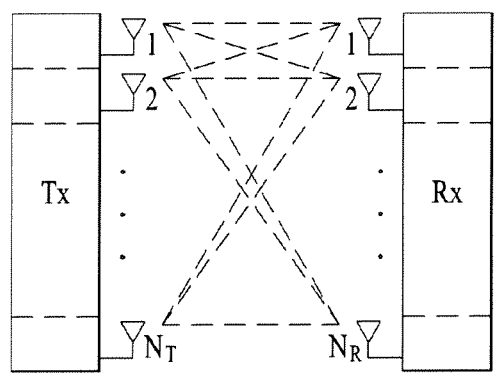
FIG. 5 illustrates the configuration of a general MIMO communication system.
Figure 5:
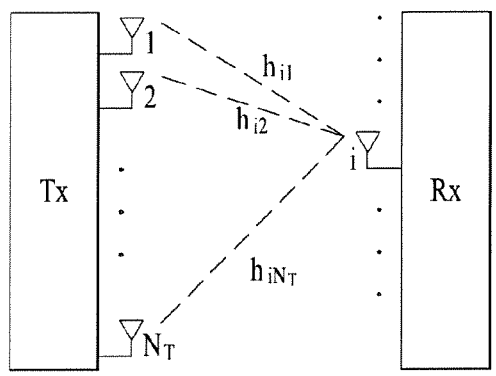

FIG. 5 illustrates the configurations of typical MIMO communication systems. Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. As illustrated in FIG. 5(a), it is assumed that NT Tx antennas and NR Rx antennas exist. Regarding a transmission signal, up to NT pieces of information can be transmitted through the NT Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmitted signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmitted signals $x_1, x_2, \ldots, x_{N_T}$ are represented as a vector X, which may be determined by Equation 5. Herein, $w_{ij}$ denotes a weight between an $i^{th}$ Tx antenna and a $j^{th}$ piece of information. W is called a weight matrix or a precoding matrix.

$$x = \quad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{12} & w_{12} & \ldots & w_{2N_T} \\ \vdots & & \ddots & \vdots \\ w_{i2} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. The vector representation of channels may be carried out in the following manner. FIG. 5(b) illustrates channels from $N_T$ Tx antennas to an $i^{th}$ Rx antenna.

As illustrated in FIG. 5(b), channels from the $N_T$ Tx antennas to an $i^{th}$ Rx antenna may be expressed as $$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix}$$

[Equation 8]

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \qquad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

[Equation 10]

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$. In general, the rank of a matrix is defined as the smaller between the numbers of independent rows and columns. Accordingly, the rank of the matrix is not larger than the number of rows or columns. For example, the rank of the matrix H, rank (H) is limited as follows.

$$\text{rank}(H) \leq \min(N_T, N_R) \qquad \text{[Equation 11]}$$

As described before, an evolved wireless communication system may adopt uplink multi-antenna transmission in order to increase uplink transmission throughput. As an uplink multi-antenna transmission scheme, a multi-transmission stream or multi-transmission layer transmission scheme may be used for a single UE for the purpose of spatial multiplexing. This is called SU-MIMO (Single User-MIMO). In uplink SU-MIMO, link adaptation may be applied to each individual transmission stream or transmission stream group. Different Modulation and Coding Schemes (MCSs) may be used for link adaptation. For this purpose, Multiple CodeWord (MCW)-based transmission may be performed on uplink.

In an MCW MIMO scheme, for example, up to two CodeWords (CWs) may be transmitted simultaneously. For the MIMO transmission, information about an MCS used in a transmitter, a New Data Indicator (NDI) indicating whether transmitted data is new data or retransmission data, and a Redundancy Version (RV) indicating a transmitted sub-packet in case of retransmission is needed. An MCS, NDI, and RV may be defined for each Transport Block (TB). A plurality of TBs can be mapped to a plurality of CWs according to a transport block-to-codeword mapping rule.

Figure 6:
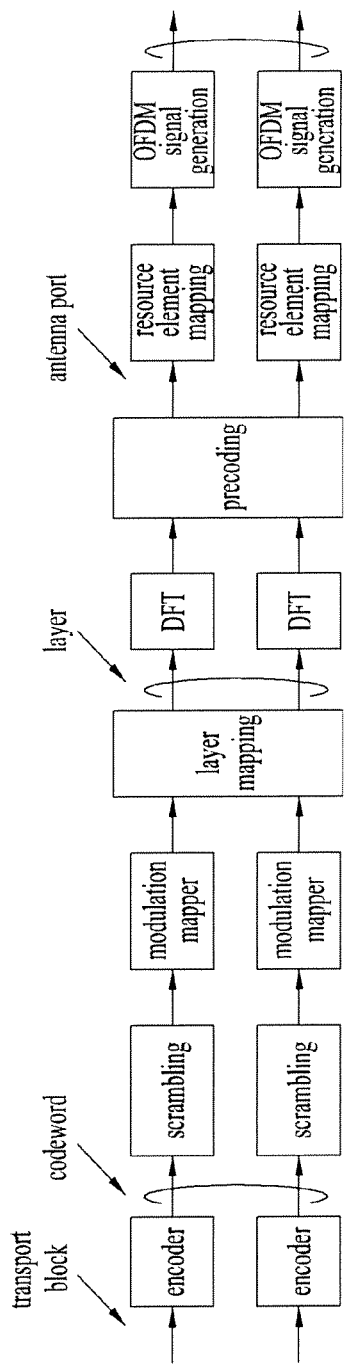
FIG. 6 is a block diagram illustrating uplink transmission configuration.

FIG. 6 is a block diagram illustrating an uplink MCW based SU-MIMO transmission configuration.

One or more codewords encoded by an encoder may be scrambled using a UE-specific scrambling signal. The scrambled codewords are modulated into complex symbols through BPSK, QPSK, 16QAM or 64QAM according to the type of a transmission signal and/or channel state. The modulated complex symbols are mapped to one or more layers. If a signal is transmitted using a single antenna, one codeword is mapped to one layer and transmitted. However, when a signal is transmitted using multiple antennas, one codeword can be mapped to one or more layers and transmitted. When one codeword is spread and mapped to a plurality of layers, symbols forming the codewords can be sequentially mapped to respective layers and transmitted. A single codeword based transmission configuration includes one encoder and one modulation block.

A signal, mapped to a layer as described above, may be subjected to discrete Fourier Transform (DFT). In addition, the layer-mapped signal can be multiplied by a predetermined precoding matrix according to a channel state and allocated to each transmit antenna. Precoding may be performed in the frequency domain after DFT such that a transmission peak-to-average power ratio (PAPR) or cubic metric (CM) of the UE is not increased when precoding is applied to the signal in a DFT-s-OFDMA configuration.

The transmission signal for each antenna, processed as above, is mapped to a time-frequency resource element to be used for transmission, subjected to an OFDM signal generator, and then transmitted through each antenna.

UE Transmit Antenna Selection

In the legacy LTE system (e.g. LTE release-8), antenna configuration and a transmission mode of an eNB can be signaled to a UE using radio resource control (RRC) signaling such that transmit antenna selection of the UE can be set. For example, 'AntennaInfo' information element (IE) is defined in RRC IEs defined by 3GPP LTE (refer to Table 1). 'AntennaInfo' IE defines a transmission mode and antenna information. 'Ue-TransmitAntennaSelection' defines setup of UE transmit antenna selection.

TABLE 1

```
-- ASN1START
AntennaInfoCommon ::= SEQUENCE {
    antennaPortsCount    ENUMERATED {an1, an2, an4,spare1}
}
AntennaInfoDedicated ::= SEQUENCE{
    TransmissionMode    ENUMERATED {
                        tm1, tm2, tm3, tm4, tm5, tm6,
                        tm7, spare1},
    codebookSubsetRestriction  CHOICE {
        n2TxAntenna - tm3   BIT STRING (SIZE (2) ),
        n4TxAntenna - tm3   BIT STRING (SIZE (4) ),
        n2TxAntenna - tm4   BIT STRING (SIZE (6) ),
        n4TxAntenna - tm4   BIT STRING (SIZE (64) ),
        n2TxAntenna - tm5   BIT STRING (SIZE (4) ),
        n4TxAntenna - tm5   BIT STRING (SIZE (16) ),
        n2TxAntenna - tm6   BIT STRING (SIZE (4) ),
        n4TxAntenna - tm6   BIT STRING (SIZE (16) )
    }  OPTIONAL,
    Ue-TransmitAntennaSelection  CHOICE{
        Release             NULL,
        Setup               ENUMERATED {closedLoop, openLoop}
    }
}
-- ASN1STOP
```

In the legacy LTE system (e.g. LTE release-8), a UE has two physical antennas and a power amplifier (PA). The UE can achieve downlink multi-layer transmission by performing downlink reception through two antennas. The UE performs uplink transmission using one of the two antennas. Using 'Ue-TransmitAntennaSelection' of Table 1, it is possible to indicate to the UE whether the UE selects an antenna used for uplink transmission and whether an antenna is selected according to direction of the eNB or by the UE when antenna selection is set.

'AntennaInfo' of Table 1 can be set to a default value or an explicit value. When 'AntennaInfo' is set to the default value, 'Ue-TransmitAntennaSelection' is released. If 'AntennaInfo' is set to an explicit value of a null bit, 'Ue-TransmitAntennaSelection' is released. When 'AntennaInfo' is set to an explicit value of 1 bit, 'Ue-TransmitAntennaSelection' is set as setup.

More specifically, a UE operating in the legacy LTE system (e.g. LTE release-8) does not performs antenna selection (that is, antenna selection is released) when antenna information IE is set to a default value.

When the antenna information IE is set as an explicit value, information regarding a transmission mode, codebook subset restriction and antenna selection can be designated. Here, while bits for the transmission mode and codebook subset restriction are allocated all the time, a bit for antenna selection may be allocated or not. If the bit for antenna selection is not allocated, antenna selection is released. UE antenna selection can be activated only when the bit for antenna selection is allocated.

When open-loop antenna selection (that is, an antenna is selected without a direction of the eNB) is indicated even if antenna selection is activated, additional signaling for antenna selection is not required. If closed-loop antenna selection (that is, antenna selection according to a direction of the eNB) is indicated, it is necessary to indicate a UE antenna selected by the eNB. To achieve this, information on the UE antenna selected by the eNB can be signaled using CRC masking of DCI format 0.

In summary, it is possible to set whether the UE performs transmit antenna selection through higher layer (e.g. RRC) signaling. When transmit antenna selection of the UE is not activated or supported, the UE performs uplink transmission through antenna port 0. When transmit antenna selection of the UE is set and applicable, the eNB indicates an antenna to be selected (closed-loop antenna selection) or the UE selects a transmit antenna (open-loop antenna selection). When a transmit antenna of the UE is selected in the closed-loop manner, the eNB can indicate an antenna port to be selected using CRC masking of DCI format 0. This will be described below in more detail.

Uplink Scheduling Control Information

In the legacy 3GPP LTE system, single codeword transmission is performed through uplink transmission and uplink scheduling information (or uplink grant information) regarding single codeword transmission can be provided through a PDCCH having DCI format 0. Conventional DCI format 0 can be defined as shown in Table 2.

TABLE 2

| Format 0 | |
|---|---|
| Contents | Number of bit |
| Flag for format 0/format 1A differentiation | 1 bit |
| Hopping flag | 1 bit |
| Resource block assignment and hopping resource allocation | N bits |
| Modulation and coding scheme and redundancy version | 5 bits |
| New data indicator | 1 bit |

TABLE 2-continued

| Format 0 | |
|---|---|
| Contents | Number of bit |
| TPC command for scheduled PUSCH | 2 bits |
| Cyclic shift for DMRS | 3 bits |
| UL index (for TDD) | 2 bits |
| Downlink Assignment Index (for TDD) | 2 bits |
| CQI request | 1 bit |

Fields of DCI format 0 shown in Table 2 are described in detail.

'Flag for format 0/format 1A differentiation' is a field for differentiating DCI format 0 from DCI format 1A. DCI format 1A is a DCI format for scheduling downlink transmission. Since DCI format 1A has the same payload size as that of DCI format 0, the field for differentiating DCI format 0 and DCI format 1A which have the same format from each other is included in DCI format 0. 'Flag for format0/format 1A differentiation' field indicates DCI format 0 when it has a value of 0 and indicates DCI format 1A when it has a value of 1.

'Hopping flag' field indicates whether PUSCH frequency hopping is applied. 'Hopping flag' field indicates that PUSCH frequency hopping is not applied when it has a value of 0 and indicates that PUSCH frequency hopping is applied when it has a value of 1. Frequency hopping means allocation of PUSCH to different frequencies in first and second slots of a subframe.

'Resource block assignment and hopping resource allocation' field indicates resource block allocation information in an uplink subframe according to whether PUSCH frequency hopping is applied.

'Modulation and coding scheme and redundancy version' field indicates a modulation order and a redundancy version (RV) for a PUSCH. RV represents information indicating which subpacket is retransmitted. From among 32 states represented by 5 bits, 0 to 28 are used to indicate the modulation order and 29 to 31 are used to represent RV indexes (1, 2 and 3).

'New data indicator' field indicates whether uplink scheduling information is for new data or retransmission. 'New data indicator' field indicates new data transmission when it is toggled from an NDI value of previous transmission and indicates retransmission when it is not toggled.

'TPC command for scheduled PUSCH' field indicates a value for determining transmit power for PUSCH transmission.

'Cyclic shift for DMRS' field represents a cyclic shift value used to generate a sequence for an uplink demodulation reference signal (DMRS). The DMRS is a reference signal used for uplink channel estimation for each antenna port or each layer.

'UL index (for TDD)' field indicates a subframe index, etc. configured for uplink transmission in specific uplink-downlink configuration when a radio frame is configured according to TDD.

'Downlink Assignment Index (for TDD)' field indicates the number of subframes configured for PDSCH transmission in specific uplink-downlink configuration when a radio frame is configured according to TDD.

'CQI request' field represents a request for aperiodic CQI (Channel Quality Information), PMI (Precoding Matrix Indicator) and RI (Rank Indicator) reporting using a PUSCH. When 'CQI request' field is set to 1, a UE transmits aperiodic CQI, PMI and RI report using a PUSCH.

CRC Attachment

CRC of a PDCCH can be masked with a specific sequence. CRC can detect an error in DCI transmission. A CRC parity bit may have a size of 16 bits and is attached to a PDCCH payload. When the PDCCH payload has a size of A, the entire sequence in which the CRC parity bit is attached to the PDCCH payload can be represented as b0, b1, b2, b3, ..., bB-1 (B=A+L).

When UE transmit antenna selection is not set or applicable, the CRC parity bit can be scrambled with an RNTI (xrnti,0, xrnti,1, ..., xrnti,15) according to purpose after being attached to the PDCCH payload.

When UE transmit antenna selection is set and applicable, a CRC parity bit of a PDCCH of DCI format 0 can be scrambled with an antenna selection mask (xAS,0, xAS,1, ..., xAS,15) and an RNTI (xrnti,0, xrnti,1, ..., xrnti,15) according to purpose after being attached to the PDCCH payload. Consequently, the entire sequence in which the CRC parity bit is attached to the PDCCH payload can be represented as c0, c1, c2, c3, cB-1. Here, the relationship between ck and bk is represented by Equation 12.

$$c_k = b_k \text{ for } k=0,1,2,\ldots,A-1$$

$$c_k = (b_k + x_{rnti,k-A} + x_{AS,k-A}) \bmod 2 \text{ for } A, A+1, A+2, \ldots, A+15$$

[Equation 12]

The UE antenna selection mask (xAS,0, xAS,1, ..., xAS,15) can be represented as shown in Table 3.

TABLE 3

| UE transmit antenna selection | Antenna selection mask <xAS, 0, xAS, 1, ..., xAS, 15> |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |

Sounding Reference Signal (SRS)

A sounding reference signal (SRS) is used for frequency-selective scheduling on uplink through channel quality measurement by an eNB and is not associated with uplink data and/or control information transmission. However, the SRS is not limited thereto and can be used for improved power control or various start-up functions of UEs which are not scheduled. The start-up functions may include an initial modulation and coding scheme (MCS), initial power control for data transmission, timing advance, frequency semi-selective scheduling (selective allocation of frequency resources in the first slot of a subframe and pseudo-randomly hopping to a different frequency in the second slot), etc., for example.

In general, a subframe in which an SRS is transmitted by an arbitrary UE in a cell is indicated according to cell-specific broadcast signaling. 15 available configurations of subframes in which the SRS can be transmitted in each radio frame are indicated through cell-specific broadcast signaling. Flexibility for adjusting SRS overhead according to a network deployment scenario can be provided according to configuration. In the meantime, in a system which supports uplink multi-antenna transmission, aperiodic SRS transmission by the UE at a specific time according to a direction of the eNB is discussed. Accordingly, the eNB can recognize an uplink channel through multiple antennas of the UE.

An SRS can be configured such that it is transmitted on the last SC-FDMA symbol of a constantly configured subframe. PUSCH data transmission on an SC-FDMA symbol designated for SRS transmission is not permitted.

Control Information for Uplink Multi-Antenna Transmission

In the legacy LTE system (e.g. release-8 or 9), a UE has two antennas and a single PA, and thus the UE performs uplink single-antenna port transmission. In an LTE-A system (e.g. release-10) which supports uplink multi-antenna transmission, a UE has multiple antennas and multiple PAs, and thus the UE can perform uplink multi-antenna port transmission. A single-layer transmission technique for increasing a signal-to-noise ratio (SNR) by varying a precoding weight when the same signal is transmitted through multiple antennas and a multi-layer transmission technique for improving throughput while transmitting different signals through multiple antennas can be used as a multi-antenna transmission method.

A UE needs to communicate with an eNB using a basic transmission method until the eNB acquires information on antenna configuration of the UE. Furthermore, when a UE (e.g. an LTE-A UE) having an evolved antenna configuration enters an eNB (e.g. legacy eNB) operating in the legacy LTE system, the UE having an evolved antenna configuration needs to be capable of communicating with the eNB according to the same transmission method as that of the UE (e.g. legacy UE) operating in the legacy LTE system. To achieve this, the LTE-A UE needs to be designed to perform the transmission method defined in the legacy LTE system. To achieve this, a UE having multiple antennas and multiple PAs needs to be able to perform single antenna port transmission.

A description will be given of single-antenna port transmission defined in the legacy LTE system. Since the legacy UE includes a plurality of antennas and a single PA, the legacy UE uses a single antenna for signal transmission. That is, the single PA is connected to one of two transmit antennas. In this context, the single-antenna port transmission scheme in the legacy LTE system supports antenna selection. Antenna selection may be carried out in two manners. One of the manners is a scheme (i.e. a closed-loop antenna selection scheme) by which an eNB designates an antenna used by the UE for transmission. The eNB can indicate information about antenna selection to the UE using CRC masking of DCI format 0. The closed-loop antenna selection scheme provides an advantage of achieving spatial multiplexing. The other manner is a scheme (i.e. open-loop antenna selection scheme) by which the UE designates an antenna used by the UE for transmission.

Since a UE has multiple antennas and multiple PAs in the LTE-A system, an antenna to be used for uplink transmission of the UE can be determined according to a different scheme even though mapping of one PA with one antenna by the UE, as in the legacy LTE system, is not defined. For example, an antenna to be used by the UE for uplink transmission can be determined even if information on a UE antenna port designated by the eNB is not provided through PDCCH CRC masking as in the conventional closed-loop antenna selection operation. That is, PDCCH CRC masking used for closed-loop antenna selection in the legacy LTE system can be used for other purposes.

In the meantime, when control information for uplink multi-antenna transmission is configured by simply extending control information for uplink single-antenna transmission, control signal overhead may increase. This deteriorates system performance and reduces throughput. Therefore, it is necessary to prevent the control signal overhead from increasing.

The present invention proposes a method for transmitting, at an eNB, control information necessary for a UE while preventing control signal overhead from increasing in multi-antenna transmission. Specifically, the present invention describes methods of using CRC masking, which is used for closed-loop antenna selection for uplink single-antenna transmission in the legacy LTE system, for control information for uplink multi-antenna transmission. Various embodiments of the present invention will now be described in detail.

Embodiment 1

The present embodiment relates to a method by which an eNB provides control information regarding mapping of UE transmit antennas to power amplifiers (PAs).

To support an uplink multi-antenna transmission method, precoding weight information in the form of a codebook, which is shared by the UE and the eNB, can be used. The precoding weight to be used for uplink transmission may be signaled to the UE through a PDCCH in an uplink grant DCI format.

Precoding weights may include an antenna selection vector or a turn-off vector. In case of 2 transmit antennas, the antenna selection vector may include [1 0] and [0 1] and the antenna turn-off vector may include $[1\ 0]/(\sqrt{2})$ and $[0\ 1]/(\sqrt{2})$. In case of 4 transmit antennas, the antenna selection vector may include [1 1 0 0], [1 0 1 0], [1 0 0 1], [0 1 1 0], [0 1 0 1] and [0 0 1 1] and the antenna turn-off vector may include $[1\ 1\ 0\ 0]/(\sqrt{2})$, $[1\ 0\ 1\ 0]/(\sqrt{2})$, $[1\ 0\ 0\ 1]/(\sqrt{2})$, $[0\ 1\ 1\ 0]/(\sqrt{2})$, $[0\ 1\ 0\ 1]/(\sqrt{2})$ and $[0\ 0\ 1\ 1]/(\sqrt{2})$. Since an operation of selecting a certain antenna or turning off a certain antenna using a precoding weight can be performed in a multi-antenna transmission scheme, the multi-antenna transmission scheme may not need the closed-loop antenna selection scheme for single-antenna transmission of the legacy LTE system. Therefore, CRC masking, which is used for control information for closed-loop antenna selection in the legacy LTE system, can be used for other purposes. A description will be given of a method of using CRC masking for control information for determining multiple PAs mapped to multiple antennas.

First, a combination of multiple PAs mapped to multiple antennas is described. An antenna-to-PA mapping relationship can be determined by the UE. However, antennas may not have uniform gain in a specific situation. It can be assumed that signal transmission from an antenna is disturbed according to a manner in which a user grips the UE with a hand, for example. This can be called antenna gain imbalance (AGI). Although the UE cannot check antenna power thereof, the eNB that receives signals from the UE can check the antenna power of the UE. Accordingly, it is necessary for the eNB to indicate mapping of a specific antenna with a specific PA to the UE in a situation such as an AGI state. The eNB can indicate antenna-to-PA mapping of the UE using PDCCH CRC masking.

In this specification, a scheme by which the eNB indicates antenna-to-PA mapping to the UE is called 'closed-loop PA mapping' and a scheme by which the UE performs antenna-to-PA mapping is called 'open-loop PA mapping'. Whether application of PA mapping is set or not can be applied only for LTE-A UE, not for the legacy UE. That is, it is possible to indicate whether PA mapping is applied through higher layer signaling (e.g. RRC signaling) for an LTE-A UE.

When PA mapping is set and applicable according to higher layer signaling, an indicator that distinguishes closed-loop PA mapping from open-loop PA mapping can be defined. Further, when closed-loop PA mapping is indicated, an indicator for indicating which antenna is mapped to which PA is additionally required. While such indicators may be transmitted through higher layer signaling, the indicators can be contained in a DCI format and transmitted. When the indicator indicating PA mapping is configured such that the indicator is transmitted through the DCI format, an explicit bit can be defined. When the explicit bit is contained in the DCI format, a total bit size of the DCI format may increase, and the number of blind decoding operations of the UE is increased as a new DCI format is defined. Therefore, the PA mapping indicator can be signaled through CRC masking in order to prevent the bit size of the DCI format from increasing.

Upon receiving the PA mapping indicator, the UE can map a specific antenna to a specific PA and perform uplink transmission. Examples of PA configuration are described first. For transmission through 2 transmit antennas, 2 PAs respectively having powers of (20 dBm, 20 dBm), (23 dBm, 20 dBm) or (23 dBm, 23 dBm) can be considered. For transmission through 4 transmit antennas, 4 PAs respectively having powers of (17 dBm, 17 dBm, 17 dBm, 17 dBm), (23 dBm, 17 dBm, 17 dBm, 17 dBm) or (20 dBm, 20 dBm, 17 dBm, 17 dBm) can be considered. From among a plurality of PAs having various configurations as described above, a PA used for single-antenna transmission can be determined as a PA having highest power, for example.

In the meantime, a bit indicating control information regarding PA mapping can be activated or inactivated according to UE category. The UE category can be set such that a UE belongs to a category depending on the PA configuration of the UE. In case of a UE including PAs having the same power such as (20 dBm, 20 dBm), for example, it is not necessary to set antenna-to-PA mapping. Accordingly, the bit for PA mapping is not activated in this case. In case of a UE including PAs having different powers, such as (23 dBm, 20 dBm), the bit for PA mapping can be activated because transmit power of a certain antenna may be determined differently according to antenna-to-PA mapping.

In antenna-to-PA mapping, mapping of a PA having highest power to a basic antenna port can be considered basically. That is, the basic antenna port (e.g. antenna port 0) can be mapped to the PA having highest power without additional signaling from the eNB. Provided that closed-loop PA mapping is set by the eNB and is applicable, the eNB can signal antenna port-to-PA mapping to the UE. To achieve this, PDCCH CRC masking can be applied.

In case of 2 transmit antennas, for example, a specific PA (e.g. a PA having high power) can be mapped to antenna port 0 when a CRC masking bit sequence has a value of 0 and the specific PA can be mapped to antenna port 1 when the CRC masking bit sequence has a value of 1.

In case of 4 transmit antennas, PA mapping can be indicated for each antenna port group. For example, antenna port group 0 can be composed of first and second antenna ports and antenna port group 1 can be composed of third and fourth antenna ports. Otherwise, antenna port group 0 can include the first and third antenna ports and antenna port group 1 can include the second and fourth antenna ports. In such an antenna port group configuration, a specific PA (e.g. PA having high power) can be mapped to antenna port group 0 when the CRC masking bit sequence has a value of 0 and the specific PA can be mapped to antenna port group 1 when the CRC masking bit sequence has a value of 1.

As described above, whether the UE executes an antenna-to-PA mapping function can be determined through higher layer signaling. Provided that antenna-to-PA mapping of the UE is not activated or supported, the UE maps the specific PA (PA having high power) to the basis antenna port (antenna port 0) and performs uplink transmission. When antenna-to-PA mapping of the UE is set and applicable, the eNB can indicate antenna-to-PA mapping (closed-loop PA mapping), or the UE can perform antenna-to-PA mapping (open-loop PA mapping). When antenna-to-PA mapping of the UE is performed in a closed-loop manner, the eNB can inform the UE which antenna port is mapped to which PA using CRC masking of DCI format 0.

As described above, control information for determining antenna-to-PA mapping can be transmitted from the eNB to the UE to support uplink multi-antenna transmission, and control information for uplink multi-antenna transmission can be provided without changing (without increasing) the bit size of PDCCH DCI format when the PDCCH CRC masking bit sequence is used.

Embodiment 2

The present embodiment relates to a scheme by which the eNB provides information that indicates different uplink resource allocation schemes to the UE.

Uplink resource allocation schemes are described first. The legacy LTE system (e.g. release-8 or 9) uses a contiguous resource allocation scheme to allow uplink transmission to be performed with a low PAPR. Contiguous resource allocation means allocation of contiguous frequency resources for uplink transmission. Since a high PAPR requires a PA having a long linear period, that is, expensive PA, a low PAPR is preferable. An LTE-A system (e.g. release-10) supports non-contiguous resource allocation as well as contiguous resource allocation. Non-contiguous resource allocation can increase transmission efficiency since frequency resources can be selectively used although it increases a PAPR in uplink transmission.

Accordingly, an LTE-A UE supports both single-antenna port transmission and multi-antenna port transmission. When the LTE-A UE operates in a single-antenna port transmission mode, it is necessary to support non-contiguous resource allocation as well as contiguous resource allocation.

In the legacy LTE system (e.g. release-8 or 9), control information (e.g. DCI format 0) defined for single-antenna port transmission mode operation includes information supporting contiguous resource allocation. Accordingly, to support non-contiguous resource allocation in the LTE-A system, newly defined control information needs to include information about non-contiguous resource allocation. For example, DCI format 0 relates to scheduling information for uplink transmission in the legacy LTE system and is defined to provide information for single-antenna transmission, synchronous-adaptive HARQ operation and contiguous resource allocation. Because the LTE-A system needs to support non-contiguous resource allocation for uplink single-antenna transmission, it is necessary to define an uplink grant DCI format capable of providing information for non-contiguous resource allocation.

When a single antenna port and contiguous resource allocation (SA-CRA) scheme and single antenna port and non-contiguous resource allocation (SA-NCRA) scheme are defined as different transmission schemes in the uplink single-antenna port transmission mode, different DCI formats can be defined for the respective schemes. In the meantime, a UE performs blind decoding to detect a PDCCH in a specific DCI format. If DCI formats have various sizes, the number of blind decoding operations of the UE increases. It is possible to consider definition of different DCI formats having the same size in order to define various DCI formats without increasing the number of blind decoding operations.

A DCI format for an SC-CRA scheme has been defined as DCI format 0. A DCI format for an SA-NCRA scheme can be defined such that it has the same size as that of the DCI format for SA-CRA. DCI format 0 includes information about resource allocation, MCS, NDI, cyclic shift for a DMRS, and information on power control (refer to Table 2). The information other than the information about resource allocation can be commonly used for SA-CRA scheme and SA-NCRA scheme. Accordingly, it is possible to define the DCI format for SA-CRA scheme and the DCI format for SA-NCRA scheme such that the two DCI formats have the same size by setting the size of a resource allocation field for supporting the SA-CRA scheme to equal to the size of a resource allocation field for supporting the SA-NCRA scheme.

In DCI format 0, the resource allocation field for SA-CRA is defined as N bits and 1 bit is used for frequency hopping (refer to Table 2). Here, since frequency hopping is used to acquire frequency diversity by changing frequency resource positions on a slot-by-slot basis in a situation in which allocation of contiguous frequency resources is permitted, application of frequency hopping to the SA-NCRA scheme in which allocation of contiguous frequency resources is not restricted is meaningless. Accordingly, the bit for frequency hopping is unnecessary in SA-NCRA. In view of this, the resource allocation field for SA-NCRA can be composed of N+1 bits (that is, resource allocation field for SA-CRA (N bits)+frequency hopping field (1 bit) in DCI format 0) in order to set the size of the DCI format for supporting uplink SA-CRA to equal to the size of the DCI format for supporting uplink SA-NCRA.

When the uplink single-antenna port transmission mode is indicated, definition of an indicator which indicates which one of contiguous resource allocation or non-contiguous resource allocation is applied can be considered.

In this context, a padding bit that is a meaningless bit may be added to DCI format 0 such that DCI format 0 has the same size as DCI format 1A. That is, when the number of information bits of DCI format 0 is smaller than the payload size of DCI format 1A, 0s corresponding to the difference between the number of information bits of DCI format 0 and the payload size of DCI format 1A can be added to DCI format 0. The padding bit is at least 1 bit.

Such a padding bit can be used for a special purpose in the DCI format for supporting SA-NCRA. For example, when the resource allocation field for SA-NCRA is composed of N bits (or N+1 bits as described above), at least one padding bit can be used as an indicator that indicates SA-CRA or SA-NCRA. For example, when the padding bit is '0', the corresponding DCI format indicates scheduling information of SA-CRA. When the padding bit is '1', the corresponding DCI format indicates scheduling information of SA-NCRA.

In addition, a format indicator field defined in DCI format 0 for SA-CRA, that is, 'flag for format 0/format 1A differentiation' field is defined to differentiate DCI format 0 for uplink scheduling from DCI format 1A for downlink scheduling. In the DCI format for supporting SA-NCRA, the format indicator field is meaningless information, and thus 1 bit for the format indicator field can be used for other purposes. For example, the resource allocation field for SA-NCRA can be defined as a field having N+2 bits (that is, resource allocation field (N bits) for SA-CRA+frequency hopping field (1 bit)+format indicator field (1 bit) in DCI format 0).

Provided that the DCI format for supporting SA-CRA and the DCI format for supporting SA-NCRA have the same size, as described above, when the UE decodes a DCI format, the UE needs to know whether the DCI format is for SA-CRA scheduling or SA-NCRA scheduling. To achieve this, PDCCH CRC masking can be used as control information for differentiating SA-CRA from SA-NCRA. In the legacy LTE system, a bit sequence used for PDCCH CRC masking was used for an eNB to indicate which antenna port is selected to a UE when closed-loop antenna selection is set and applicable. In the LTE-A system, however, the CRC masking bit sequence can be considered to be control information for differentiating SA-CRA from SA-NCRA.

In this case, to define CRC masking for a purpose different from the conventional purpose in the LTE-A system, it is necessary to prevent the new purpose from being confused with the conventional purpose (i.e. antenna selection information). Accordingly, a non-contiguous allocation enable indicator can be newly set in the LTE-A system through higher layer (e.g. RRC) signaling. Definition can be made that PDCCH CRC masking is used as control information for differentiating SA-CRA from SA-NCRA when application of the non-contiguous allocation enable indicator is set and enabling of non-contiguous allocation is indicated through this indicator.

When CRC masking is not used for closed-loop antenna selection, antenna selection is not indicated or, even if antenna selection is applied, open-loop antenna selection is indicated. Since antenna selection can be indicated using a precoding weight such as an antenna selection vector or an antenna turn-off vector in the LTE-A system, CRC making can be used as control information for indicating a resource allocation scheme, as described above, instead of being used for closed-loop antenna selection.

As described above, the eNB can provide the control information that indicates contiguous resource allocation or non-contiguous resource allocation for uplink multi-antenna transmission to the UE. Furthermore, when the PDCCH CRC masking bit sequence is used as the control information, it is possible to provide control information for uplink multi-antenna transmission while DCI formats for different resource allocation schemes have the same size.

Embodiment 3

The present embodiment relates to a scheme by which an eNB provides control information for SRS transmission triggering to a UE.

The legacy LTE system supports only single-antenna transmission although a UE has two antennas. An SRS can be transmitted through the 2 antennas to support antenna selection. When antenna selection is set through RRC signaling and becomes applicable, the SRS is transmitted through the 2 antennas. At a specific timing, the SRS is transmitted through a specific antenna because the UE of the legacy LTE system has 2 antennas and a single PA.

The LTE-A system supports uplink multi-antenna transmission. For multi-antenna transmission, it is necessary to secure precoding weights, channel state information, etc. used for multi-antenna transmission. Accordingly, for multi-antenna transmission, an SRS needs to be transmitted through multiple antennas such that the eNB secures channel characteristics with respect to the multiple antennas even if the UE currently performs single-antenna transmission.

In the legacy LTE system, SRS transmission is performed in an appointed period. In the LTE-A system, however, the eNB needs to request the UE to perform aperiodic SRS transmission at a specific time in order to measure an uplink multi-antenna channel from the UE, in addition to periodic SRS transmission.

A dynamic method which includes an SRS transmission request indicator in a PDCCH DCI format can be considered as an SRS transmission request method. When control information for indicating SRS transmission is included in a DCI format, it is necessary not to increase or change the size of the DCI format. This is for the purpose of preventing the number of blind decoding operations of the UE from increasing. Therefore, it is possible to use PDCCH CRC masking for transmission of control information about SRS transmission triggering instead of defining a new field in the DCI format. For example, when the CRC masking bit sequence has a specific value, the UE can be aware that a multi-antenna SRS transmission request is transmitted from the eNB through the CRC masking bit sequence.

Additionally, to use CRC masking as aperiodic multi-antenna SRS transmission triggering control information, an indicator that enables multi-antenna SRS triggering through higher layer (e.g. RRC) signaling can be added. For example, whether the UE performs multi-antenna SRS transmission can be set through RRC signaling. If multi-antenna SRS transmission of the UE is not activated or supported, the UE can perform period SRS transmission as in the conventional scheme. When multi-antenna SRS transmission of the UE is set and applicable, the eNB can indicate multi-antenna SRS transmission. That is, provided that multi-antenna SRS transmission is activated through higher layer signaling and multi-antenna SRS transmission is triggered (i.e. indicated) through PDCCH CRC masking, the UE can transmit an SRS through multiple antennas. Such a high layer signaling indicator is a parameter that can be defined for LTE-A UEs.

As described above, the eNB can provide the aperiodic multi-antenna SRS transmission triggering control information to the UE to support uplink multi-antenna transmission. When the PDCCH CRC masking bit sequence is used as the control information, it is possible to provide control information for uplink multi-antenna transmission without changing (without increasing) a PDCCH DCI format size.

As described above, the embodiments of the present invention propose schemes for transmitting control information for uplink multi-antenna transmission more efficiently. According to the embodiments of the present invention, it is possible to signal control information necessary for uplink multi-antenna transmission without increasing a control information bit size. For example, control information necessary for uplink multi-antenna transmission can be configured using PDCCH CRC masking.

In the above-described embodiments 1, 2 and 3, an exemplary configuration of a DCI format for uplink scheduling is shown in Table 4. However, the present invention is not limited thereto and the DCI format can be configured in various manners as described in the specification.

TABLE 4

| Contents | Number of bit | Comment | |
|---|---|---|---|
| Flag for UL/DL format differentiation | 1 | | For non-contiguous resource |
| Hopping flag | 1 | For non-contiguous | |

TABLE 4-continued

| Contents | Number of bit | Comment | |
|---|---|---|---|
| Resource block assignment | N | resource allocation, N + 1 bits is used | allocation, N + 2 bits is used |
| MCS and RV | 5 | | |
| NDI | 1 | | |
| TPC command for scheduled PUSCH | 2 | | |
| Cyclic shift for DMRS | 3 | | |
| UL index (for TDD) | 2 | | |
| Downlink Assignment Index (for TDD) | 2 | | |
| Padding bit | 1 | To Indicate resource allocation types | |
| CQI request | 1 | | |
| CRC | 16 | UE transmit antenna selection, Antenna-to-PA mapping, SA-CRA or SA-NCRA indication Aperiodic SRS request triggering | |

As shown in Table 4, a non-contiguous resource block allocation field (N+1 bits) can be configured using the resource block allocation field (N bit) and hopping flag bit (1 bit) of DCI format 0. Otherwise, a non-contiguous resource block allocation field (N+2 bits) can be configured using the resource block allocation field (N bit), hopping flag bit (1 bit) and format indicator (1 bit) of DCI format 0.

In addition, as shown in Table 4, a padding bit of 1 bit can be used to indicate a resource allocation scheme (contiguous resource allocation or non-contiguous resource allocation).

Furthermore, a 16-bit CRC masking bit sequence can be defined for various purposes, as shown in Table 4. While the CRC masking bit sequence is defined to indicate transmit antenna selection of the UE in the legacy LTE system, the CRC masking bit sequence can be defined for control information for uplink multi-antenna transmission in the LTE-A system. For example, it is possible to define antenna-to-PA mapping, to indicate contiguous resource allocation or non-contiguous resource allocation or to indicate aperiodic multi-antenna SRS transmission using CRC masking.

Description of DCI format 0 of Table 2 can be applied to the unexplained part of Table 4.

Figure 7:
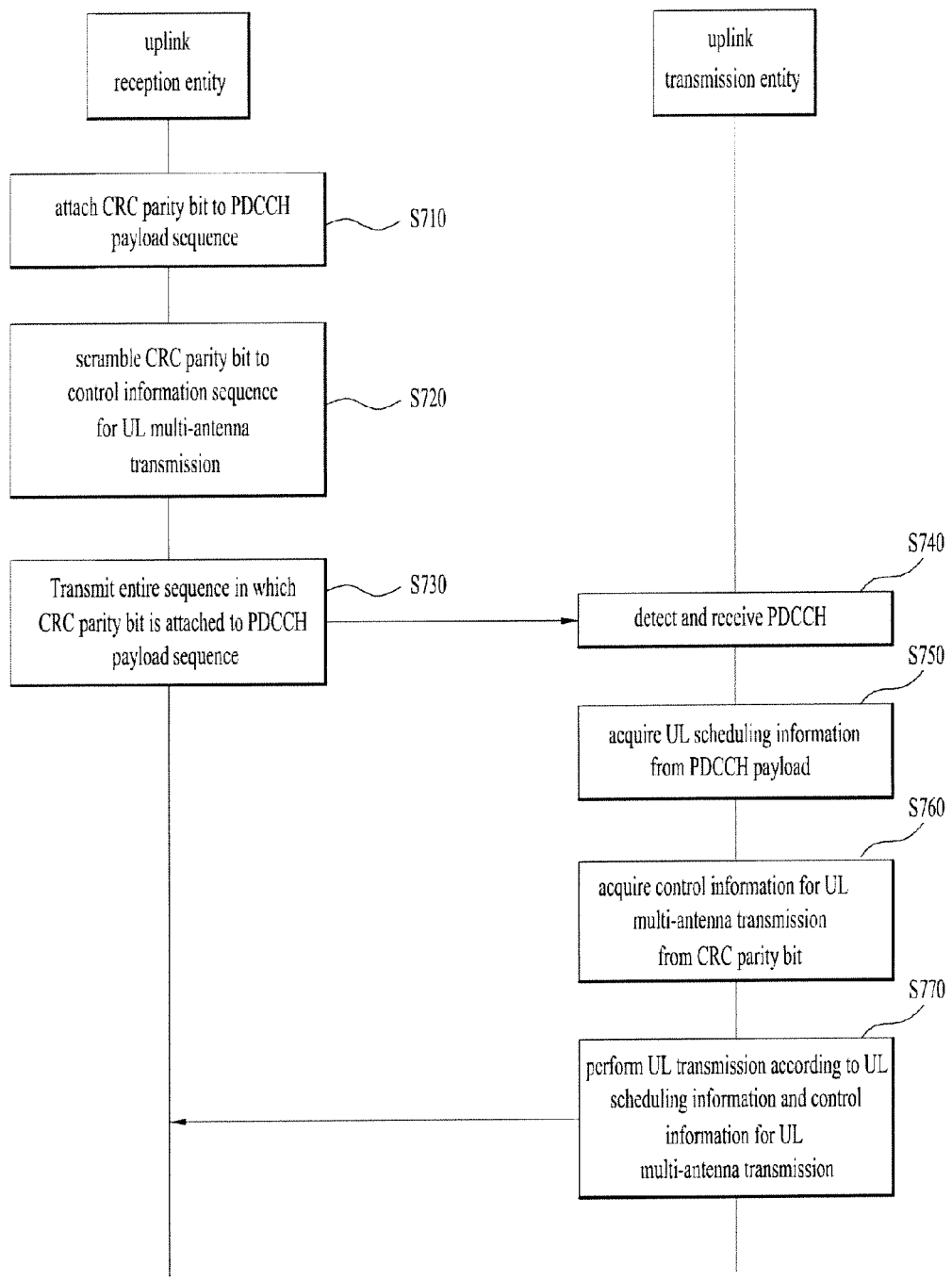
FIG. 7 is a flowchart illustrating a method for transceiving control information for uplink multi-antenna transmission according to an embodiment of the present invention.

A method for transceiving control information for uplink multi-antenna transmission according to an embodiment of the present invention will now be described with reference to FIG. 7. In FIG. 7, an uplink reception entity may be an eNB and an uplink transmission entity may be a UE.

The eNB may add a CRC parity bit to a PDCCH payload sequence (S710). The PDCCH payload sequence includes uplink scheduling information, for example, and the CRC parity bit is attached to the payload sequence for PDCCH error detection. In the present invention, the eNB can signal control information necessary for uplink multi-antenna transmission to the UE using the CRC parity bit.

The eNB may scramble the CRC parity bit (S720). A bit sequence in which the CRC parity bit is scrambled can be represented as a CRC masking bit sequence. The CRC parity bit can be scrambled to a control information sequence for uplink multi-antenna transmission. The control information for uplink multi-antenna transmission, which corresponds to the CRC masking bit sequence, may be control information that defines antenna-to-PA mapping, control information that differentiates CRA from NCRA, or control information which indicates aperiodic SRS transmission through multiple uplink antennas. The CRC parity bit may be additionally masked with an RNTI according to usage of PDCCH.

The eNB may transmit the entire sequence including the PDCCH payload sequence and the scrambled CRC parity bit to the UE (S730).

The UE may detect and receive a PDCCH corresponding thereto (S740). The UE can detect the PDCCH through blind decoding. The UE may acquire uplink scheduling information (resource allocation information, MCS, NDI, etc.) from the PDCCH payload sequence (S750). The UE may obtain control information (antenna-to-PA mapping information, information for differentiating CRA from NCRA, or uplink multi-antenna SRS transmission triggering information) from the bit sequence masked with the PDCCH CRC parity bit (S760).

The UE can perform uplink transmission on the basis of the uplink scheduling information and the uplink multi-antenna transmission control information (S770).

In the method for transceiving control information for uplink multi-antenna transmission described with reference to FIG. 7, the aforementioned various embodiments of the present invention can be independently applied or two or more embodiments can be applied together.

The principle proposed by the present invention can be equally applied to a case in which an eNB or a relay node provides control information for uplink multi-antenna transmission from the relay node to the eNB and uplink multi-antenna transmission from a UE to the relay node.

Figure 8:
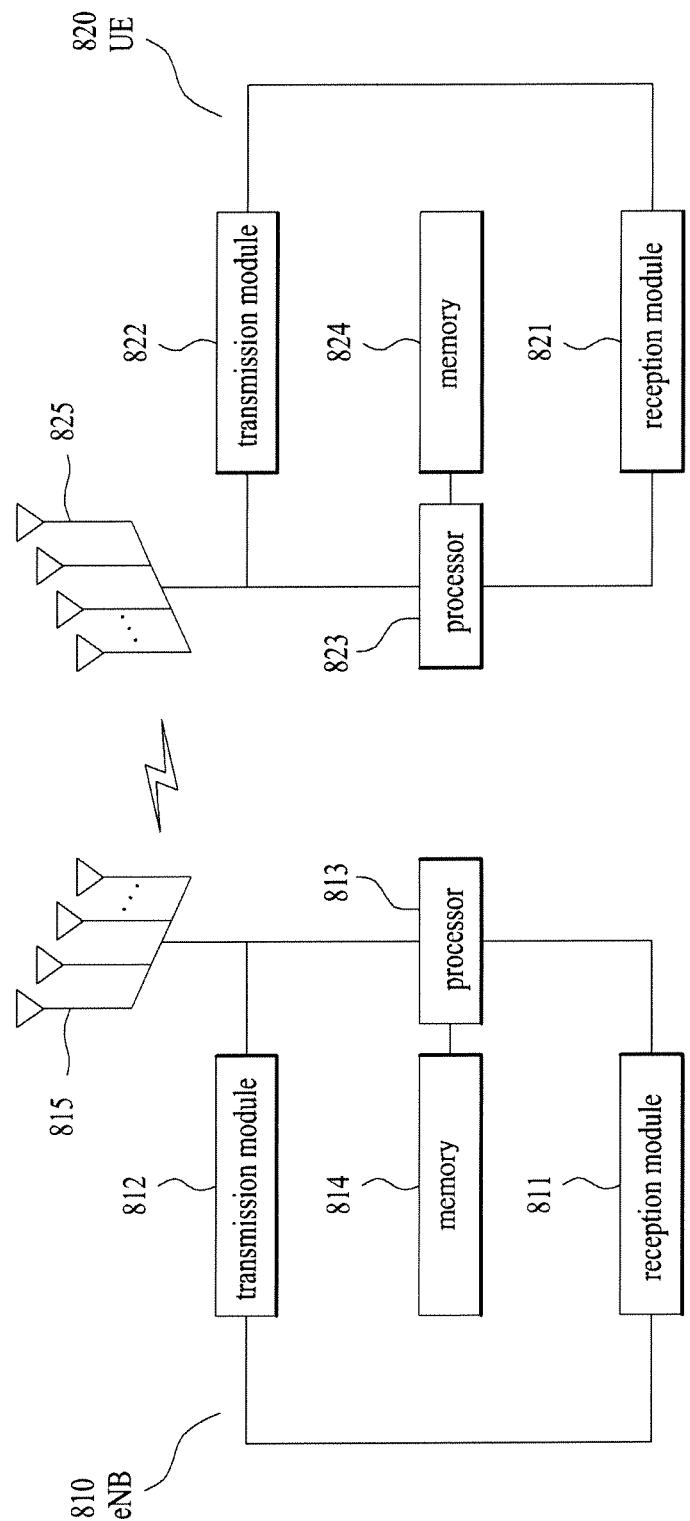
FIG. 8 illustrates configurations of an eNB and UE according to an embodiment of the present invention.

FIG. 8 is a block diagram of an eNB and a UE according to an embodiment of the present invention.

Referring to FIG. 8, the eNB 810 may include a reception module 811, a transmission module 812, a processor 813, a memory 814, and a plurality of antennas 815. The plurality of antennas 815 means that the eNB 810 supports MIMO transmission and reception. The reception module 811 may receive various types of signals, data and information from the UE on uplink. The transmission module 812 may transmit various types of signals, data and information to the UE on downlink. The processor 813 may control the overall operation of the transmitter 810.

The eNB 810 may be configured to transmit control information for uplink multi-antenna transmission. The processor 813 of the eNB 810 may be configured to attach a CRC parity bit to a PDCCH payload sequence including uplink transmission resource allocation information and to scramble the CRC parity bit attached to the PDCCH payload sequence to a bit sequence which indicates control information for uplink multi-antenna transmission. In addition, the processor 813 may be configured to transmit the entire sequence in which the scrambled CRC parity bit is attached to the payload sequence to the UE 820 through the transmission module 812. The control information for uplink multi-antenna transmission, which corresponds to the bit sequence in which the CRC parity bit is scrambled, may be antenna-to-PA mapping information, control information for differentiating CRA from NCRA, or uplink multi-antenna SRS transmission triggering information.

Additionally, the processor 813 of the eNB 810 may process received information, information to be transmitted to the outside, etc. The memory 814 may store information processed by the processor 813 for a predetermined time and may be replaced with a component such as a buffer (not shown).

Referring to FIG. 8, the UE 820 may include a reception module 821, a transmission module 822, a processor 823, a memory 824, and a plurality of antennas 825. The plurality of antennas 825 means that the UE 820 supports MIMO transmission and reception. The reception module 821 may receive various types of signals, data and information from the eNB on downlink. The transmission module 822 may transmit various types of signals, data and information to the eNB on uplink. The processor 823 may control the overall operation of the UE 820.

The UE 820 may be configured to perform uplink multi-antenna transmission. The processor 823 of the UE 820 may be configured to receive, through the reception module 821, the entire sequence, which is obtained by attaching a CRC parity bit to a PDCCH payload sequence including uplink transmission resource allocation information and scrambling the CRC parity bit attached to the PDCCH payload sequence to a bit sequence which indicates control information for uplink multi-antenna transmission. In addition, the processor 823 may be configured to acquire uplink multi-antenna transmission scheduling information from the PDCCH payload sequence, to obtain control information for uplink multi-antenna transmission from the CRC parity bit, and to perform uplink multi-antenna transmission through the transmission module 822 according to the acquired scheduling information and control information. The control information for uplink multi-antenna transmission, which corresponds to the bit sequence to which the CRC parity bit is scrambled, may be antenna-to-PA mapping information, control information for differentiating CRA from NCRA, or uplink multi-antenna SRS transmission triggering information.

Additionally, the processor 823 of the UE 820 may process received information, information to be transmitted to the outside, etc. The memory 824 may store information processed by the processor 823 for a predetermined time and may be replaced with a component such as a buffer (not shown).

In the aforementioned configurations of the eNB and UE, the aforementioned various embodiments of the present invention can be independently applied or two or more embodiments can be combined.

Description of the eNB 810 in FIG. 8 can be equally applied to a relay node as a downlink transmission entity or an uplink reception entity and description of the UE 820 can be equally applied to a relay node as a downlink reception entity or an uplink transmission entity.

Dynamic Scheme Change for PUSCH Transmission Mode

PUSCH transmission mode is configured through RRC signalling and semi-statically changed. However, in order to operate in mode transient interval or assure robust transmission, it should be supported that configured transmission scheme is dynamically changed into fall-back scheme. To support dynamic change for transmission schemes, UE may search DCI formats which have different size in UE specific search space. For example, in order to support spatial multiplexing scheme, new DCI format which has different size with DCI format 0 should be designed. When multi-antenna port mode is configure, single antenna port scheme with contiguous allocation and spatial multiplexing scheme can be dynamically changed. In this case, additional 16 blind decoding should be operated. In order not to increase decoding complexity, it can be considered that new DCI format for UL transmission is designed to have same size with DCI format 0/1A. For example, DCI format for single antenna port scheme with non-contiguous allocation can be designed by modification of contents of DCI format 0. In Table 5, above discussion for PUSCH transmission mode is summarized.

TABLE 5

| UL Transmission mode | DCI format | Search Space | Transmission scheme of PUSCH corresponding to PDCCH |
|---|---|---|---|
| Mode 1 | DCI format 0 | Common and UE specific by C-RNTI | Single-antenna port, contiguous allocation. |
|  | DCI format 0A | UE specific by C-RNTI | Single-antenna port, non-contiguous allocation. |
| Mode 2 | DCI format 0 | Common and UE specific by C-RNTI | Single-antenna port, contiguous allocation. |
|  | DCI format 4 | UE specific by C-RNTI | Spatial multiplexing |

DCI Format for Multi-Antenna Port Mode

To support multi-antenna port mode, new DCI format should be defined. Basically, MCS/NDI for $2^{nd}$ transport block and precoding information are included in the DCI format. Also, both resource allocation methods (i.e. non-contiguous and contiguous resource allocation) can be supported and explicit bit field for aperiod SRS request can be defined. Table 6 shows contents of DCI formats for uplink multi-antenna port mode.

TABLE 6

| Contents | Number of bit | Comment |
|---|---|---|
| Flag for UL/DL format differentiation | 0/1 |  |
| Hopping flag | 1 |  |
| Resource block assignment | N |  |
| $1^{st}$ TB MCS and RV | 5 |  |
| $1^{st}$ TB NDI | 1 |  |
| $2^{nd}$ TB MCS and RV | 5 |  |
| $2^{nd}$ TB NDI | 1 |  |
| TB to codeword swap flag | 1 |  |
| Precoding information | M | 2Tx: 3-bit, 4Tx: 6-bit |
| TPC command for scheduled PUSCH | 2 |  |
| Cyclic shift for DMRS | 3 |  |
| UL index (for TDD) | 2 |  |
| Downlink Assignment Index (for TDD) | 2 |  |
| CQI request | 1 |  |
| Aperiodic SRS request | 1 |  |

Flag for UL/DL format differentiation: To reduce the number of PDCCH blind decoding, the same DCI format size can be used for both downlink and uplink in SU-MIMO transmission mode.

Hopping flag and resource block assignment: Three types of resource allocation types (i.e. type 0/1/2) are defined. Since resource allocation type 0/1 are bit map based resource allocation methods, both contiguous and non-contiguous allocation can be supported by resource allocation type 0/1. Therefore, these allocation methods can be considered for UL multi-antenna transmission mode. Also, to reduce the size of bit filed for resource block assignment, resource allocation type 2 can be employed. However, since distributed assignment method of resource allocation type 2 is not proper to support non-contiguous allocation, new resource allocation type which can be defined for single antenna transmission with non-contiguous allocation can be adopted together. In this case, one bit field is needed to indicate resource block assignment method.

MCS and redundancy version/NDI for 2nd transport block: Similar to DL MIMO, independent 5-bits MCS and RV field for each transport is defined because independent MCS fields are very helpful to support multi-antenna transmission. Also, NDI field for 2nd TB is defined to support non-blanking H-ARQ process in synchronous adaptive retransmission.

Disabled transport block indication: To support one transport block transmission among two TBs (e.g. one CW to one layer mapping or one CW to two layer mapping), it should be indicated whether transport block is enabled or disabled.

Transmission PMI: For uplink spatial multiplexing with two transmit antennas, 3-bits for precoding codebook is defined. Also, for four transmit antennas, 6-bit for precoding codebook is used.

Codeword swap flag: Codeword swap flag can be also used for uplink SU-MIMO to handle the situation in which a specific codeword suffers from deep fading or antenna gain imbalance. In this case, codeword swapping for retransmission allows spatial diversity gain to a specific codeword.

Cyclic shift indication for UL DMRS: For multi-layer channel estimation, cyclic shift separation is the primary multiplexing scheme for UL DMRS. To allocate CS indices for multi-layer, minimum required bit for CS indication is 3-bit. When one CS for a layer is indicated, CS indices for other layers can be allocated by using predefined rule.

TPC command for scheduled PUSCH: If per UE power control is introduced for UL SU-MIMO, TPC command for scheduled PUSCH keeps 2-bits.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for transmitting control information by a base station for scheduling uplink data transmission, the method comprising:
attaching cyclic redundancy check (CRC) parity bits to a physical downlink control channel (PDCCH) containing a first downlink control information (DCI) for scheduling uplink data transmission on a single antenna, the first DCI including a 1-bit first field indicating whether frequency hopping is scheduled, a N-bit second field indicating uplink resource blocks allocated according to one of a plurality of resource allocation types, and a third field indicating an aperiodic sounding reference signal (SRS) transmission,
wherein, when the uplink resource blocks are allocated according to a non-contiguous resource allocation, both of the 1-bit first field and the N-bit second field are used for indicating the uplink resource blocks;
scrambling the CRC parity bits attached to the PDCCH with a bit sequence which indicates the single antenna to be used for the uplink data transmission among multiple antennas of a user equipment;
transmitting the PDCCH payload in which the scrambled CRC parity bits is attached; and
transmitting second DCI for scheduling multi-antenna PUSCH (physical uplink shared channel) transmission,
wherein the second DCI includes a fourth field explicitly indicating a precoding weight to be used for PUSCH precoding, and wherein a 2-Tx antenna codebook for the PUSCH precoding includes a first precoding weight $$\frac{[1 \ 0]}{\sqrt{2}},$$

and a second precoding weight $$\frac{[0 \ 1]}{\sqrt{2}}.$$

2. The method according to claim 1, wherein:
the bit sequence defines antenna-to-power amplifier mapping,
when the bit sequence defines antenna-to-power amplifier mapping has a first value, a power amplifier having highest power is mapped to antenna port 0 or antenna port group 0, and when the bit sequence has a second value, the power amplifier having highest power is mapped to antenna port 1 or antenna port group 1.

3. The method according to claim 2, wherein mapping of uplink multiple antennas to multiple power amplifiers is indicated through higher layer signaling.

4. The method according to claim 1, wherein the plurality of resource allocation types comprise a contiguous resource allocation (CRA) type.

5. The method according to claim 4, wherein the frequency hopping is allowed only when the uplink transmission resource allocation has been performed according to a contiguous resource allocation (CRA) type.

6. The method according to claim 1,
wherein the first DCI supports a non-contiguous resource allocation (NCRA) type for the uplink data transmission on the single antenna, and
wherein if the NCRA type is configured, the first field is used for extending the second field instead of indicating whether the frequency hopping is scheduled.

7. The method according to claim 1, wherein when the first DCI scheduling a single antenna data transmission triggers the aperiodic SRS transmission but multi-antenna SRS transmission has been configured by high layer signaling, a PUSCH is received via the single antenna while a SRS is received via multiple antennas.

8. The method of claim 1, wherein the precoding weight indicated by the fourth field corresponds to either 2-TX antenna or 4-TX antenna.

9. The method of claim 1, wherein a codebook including precoding weights for multi-antenna PUSCH transmission is determined based on a number of antenna used for the multi-antenna PUSCH transmission.

10. The method of claim 1, wherein a number of antenna used for the multi-antenna PUSCH transmission is indicated by the fourth field.

11. The method of claim 1, wherein when a predetermined value is multiplied to the precoding weight indicated by the fourth field, a corresponding antenna is turned-off.

12. A method for performing uplink data transmission by a user equipment having multiple antennas, the method comprising:
receiving a physical downlink control channel (PDCCH) to which cyclic redundancy check (CRC) parity bits are attached, the PDCCH containing first downlink control information (DCI) for scheduling uplink data transmission on a single antenna, the CRC parity bits being scrambled with a bit sequence indicating the single antenna to be used for the uplink data transmission among the multiple antennas of the user equipment, the first DCI including a 1-bit first field indicating whether frequency hopping is scheduled, a N-bit second field indicating uplink resource blocks allocated according to one of a plurality of resource allocation types, and a third field indicating an aperiodic sounding reference signal (SRS) transmission,
wherein, when the uplink resource blocks are allocated according to a non-contiguous resource allocation, both of the 1-bit first field and the N-bit second field are used for indicating the uplink resource blocks;
acquiring the first DCI for the uplink data transmission from the PDCCH, and
transmitting uplink data according to the first DCI; and
receiving second DCI for scheduling multi-antenna PUSCH (physical uplink shared channel) transmission, wherein the second DCI includes a fourth field explicitly indicating a precoding weight to be used for PUSCH precoding, and wherein a 2-Tx antenna codebook for the PUSCH precoding includes a first precoding weight $$\frac{[1\ 0]}{\sqrt{2}},$$

and a second precoding weight $$\frac{[0\ 1]}{\sqrt{2}}.$$

13. An eNB transmitting control information for scheduling uplink data transmission in a wireless communication system, the eNB comprising:
a transmitter for transmitting a downlink signal to a user equipment (UE);
a receiver for receiving an uplink signal from the UE; and
a processor for controlling the eNB including the receiver and the transmitter,
wherein the processor is configured to
attach CRC parity bits to a physical downlink control channel (PDCCH) containing first downlink control information (DCI) for scheduling uplink data transmission on a single antenna, the first DCI including a 1-bit first field indicating whether frequency hopping is scheduled, a N-bit second field indicating uplink resource blocks allocated according to one of a plurality of resource allocation types, and a third field indicating an aperiodic sounding reference signal (SRS) transmission,
wherein, when the uplink resource blocks are allocated according to a non-contiguous resource allocation, both of the 1-bit first field and the N-bit second field are used for indicating the uplink resource blocks,
scramble the CRC parity bits attached to the PDCCH with a bit sequence which indicates the single antenna to be used for the uplink data transmission among multiple antennas of the UE, and
transmit, to the UE, the PDCCH in which the scrambled CRC parity bits is attached,
transmit second DCI for scheduling multi-antenna PUSCH (physical uplink shared channel) transmission,
wherein the second DCI includes a fourth field explicitly indicating a precoding weight to be used for PUSCH precoding, and wherein a 2-Tx antenna codebook for the PUSCH precoding includes a first precoding weight $$\frac{[1\ 0]}{\sqrt{2}},$$

and a second precoding weight $$\frac{[0\ 1]}{\sqrt{2}}.$$

14. A user equipment (UE) performing uplink data transmission in a wireless communication system, the UE comprising:
a transmitter for transmitting an uplink signal to an eNB;

a receiver for receiving a downlink signal from the eNB; and
a processor for controlling the UE including the receiver and the transmitter,
wherein the processor is configured to
receive, through the receiver, a physical downlink control channel (PDCCH) to which CRC parity bits are attached, the PDCCH containing first downlink control information (DCI) for scheduling uplink data transmission on a single antenna, the CRC parity bits being scrambled with a bit sequence indicating the single antenna to be used for the uplink data transmission among a multiple antennas of the UE, the first DCI including a 1-bit first field indicating whether frequency hopping is scheduled, a N-bit second field indicating uplink resource blocks allocated according to one of a plurality of resource allocation types, and a third field indicating an aperiodic sounding reference signal (SRS) transmission,
wherein, when the uplink resource blocks are allocated according to a non-contiguous resource allocation, both of the 1-bit first field and the N-bit second field are used for indicating the uplink resource blocks,
acquire the first DCI for the uplink data transmission from the PDCCH,
perform the uplink data transmission according to the first DCI, and
receive second DCI for scheduling multi-antenna PUSCH (physical uplink shared channel) transmission,
wherein the second DCI includes a fourth field explicitly indicating a precoding weight to be used for PUSCH precoding, and wherein a 2-Tx antenna codebook for the PUSCH precoding includes a first precoding weight $$\frac{[1\ 0]}{\sqrt{2}},$$

and a second precoding weight $$\frac{[0\ 1]}{\sqrt{2}}.$$

* * * * *